US010721877B2

(12) United States Patent
O'Neil

(10) Patent No.: US 10,721,877 B2
(45) Date of Patent: Jul. 28, 2020

(54) SPREADER MACHINE

(71) Applicant: Arthur O'Neil, Houston, TX (US)

(72) Inventor: Arthur O'Neil, Houston, TX (US)

(*) Notice: Subject to any disclaimer, the term of this patent is extended or adjusted under 35 U.S.C. 154(b) by 101 days.

(21) Appl. No.: 16/019,536

(22) Filed: Jun. 27, 2018

(65) Prior Publication Data
US 2020/0000049 A1    Jan. 2, 2020

(51) Int. Cl.
*A01G 13/02*    (2006.01)
*A01F 29/12*    (2006.01)
*A01G 3/00*    (2006.01)

(52) U.S. Cl.
CPC ......... *A01G 13/0287* (2013.01); *A01F 29/12* (2013.01); *A01G 3/002* (2013.01); *A01G 13/0262* (2013.01)

(58) Field of Classification Search
CPC ............. A01G 13/0287; A01G 3/002; A01G 13/0262; A01G 13/0281; A01G 13/02; A01F 29/12; A01F 29/00; A01F 29/01; A01F 29/09; A01F 29/095; A01F 29/10; A01F 29/14; B02C 18/00
USPC .............................................................. 47/9
See application file for complete search history.

(56) References Cited

U.S. PATENT DOCUMENTS

| | | | | |
|---|---|---|---|---|
| 2,844,914 A * | 7/1958 | Finn | ................... | A01G 13/0287 47/9 |
| 3,091,436 A * | 5/1963 | Finn | ....................... | A01C 23/04 366/131 |
| 6,131,830 A * | 10/2000 | Jones | ..................... | A01C 15/04 239/654 |
| 7,938,348 B2 * | 5/2011 | Evans | ................. | B02C 18/2216 241/225 |
| 9,393,568 B2 * | 7/2016 | Finney | .................... | B02C 21/02 |
| 2004/0208712 A1 * | 10/2004 | Wysong | ............ | B65G 69/0491 406/154 |
| 2007/0141248 A1 * | 6/2007 | Dolin | ...................... | B66F 11/04 427/181 |
| 2014/0072707 A1 * | 3/2014 | Peek, Jr. | .................. | E04B 1/76 427/140 |
| 2018/0206404 A1 * | 7/2018 | Nyboer | ................ | A01D 34/005 |
| 2019/0289796 A1 * | 9/2019 | White | .................. | A01D 42/005 |

* cited by examiner

Primary Examiner — William V Gilbert
(74) Attorney, Agent, or Firm — Bruce A. Lev

(57) ABSTRACT

A mulch cutting and spreading machine is a machine that is designed to be able to suction mulch out of the bed of a vehicle that is towing the mulch cutting and spreading machine and to simultaneously suction and chop the mulch and discharge it through a discharge hose that is directed by the user. The mulch or other such material can be then blown or spread over an area quickly in one combined action.

15 Claims, 4 Drawing Sheets

SPREADER MACHINE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of bulk material spreaders and more specifically relates to a mulch cutting and spreading machine.

2. DESCRIPTION OF THE RELATED ART

Fertilizers are any material of natural or synthetic origin (other than liming materials) that are applied to soils or to plants to supply at least one usable nutrient that is essential to the growth of the plants. Mulch is decomposed humus material applied to the surface of an area of soil or sometimes mixed in with the soil that provides nutrients to the plants that are to be grown. Depending on the type of mulch applied, the intention may be to hold moisture in the soil, add nutrients to the soil, reduce weed growth, or to enhance the visual appearance of the area. Mulch may be applied prior to planting to add nutrients or may be applied when the plants are growing for multiple purposes. Mulches of manure or compost will be incorporated naturally into the soil by the activity of worms and other organisms. The process is used both in commercial crop production and in gardening, and when applied correctly can dramatically improve soil productivity. The problem is, in the absence of typically large farm equipment, the job is a very laborious task. Very few people can practically afford the cost of this equipment and it may take more than one piece of equipment to accomplish the task. A solution is needed.

Various attempts have been made to solve problems found in spreading device art. Among these are found in: U.S. Pat. No. 3,236,527 to Suyder Clifford H; U.S. Pat. No. 3,170,675 to Mcintosh Cairnie John U.S. Pat. No. 7,543,765 to White; and U.S. Pat. No. 2,498,833 to Henry Weyer. This prior art is representative of bulk material spreaders. None of the above inventions and patents, taken either singly or in combination, is seen to describe the invention as claimed.

Ideally, a bulk material spreader should provide mulch chopping and spreading in one operation, and yet, would operate reliably and be manufactured at a modest expense. Thus, a need exists for a reliable mulch cutting and spreading machine to avoid the above-mentioned problems.

BRIEF SUMMARY OF THE INVENTION

In view of the foregoing disadvantages inherent in the known bulk material spreader art, the present invention provides a novel mulch cutting and spreading machine. The general purpose of the present invention, which will be described subsequently in greater detail, is to provide mulch chopping and spreading in one operation.

The spreader machine preferably comprises a main body including a top wall having an aperture therethrough and a cap member removably connected and removably covering the aperture in the top wall, a bottom wall and at least one side wall that includes an intake aperture therethrough, and an output aperture therethrough spaced apart from the input aperture. The side walls are connected in between the top wall and the bottom wall to form an interior volume. An intake hose is removably attached to the intake aperture and an output hose is removably attached to the output aperture.

A rotatable blade member is connected to an interior surface of the side wall adjacent the intake aperture and is adapted to cut material entering through the intake aperture. A motor located within the interior volume is adapted to rotate the rotatable blade member and suck air and material through the intake hose and push air and chopped material out through the output hose.

At least two wheel members are attached to the exterior surface of at least one of the side walls and the bottom wall. At least one brace member is releasably attached to a distal end of the intake hose and adapted to brace the intake hose upon a surface of a vehicle bed for use in sucking in material from the vehicle bed into the distal end of the intake hose.

The brace member(s) may include at least one hook portion adapted to removably hook onto a portion of the vehicle bed. The output hose includes a handle member attached to a distal end and is adapted to allow a user to move the distal end around while material is being pushed outwardly therefrom. The intake hose and the output hose are preferably formed from a flexible material chosen from the group of materials consisting of rubber and nylon. The main body is formed into a box-shape.

An intake/output switch attached to an outer surface of the main body, is electrically connected to the motor member, and is adapted to control the motor member such that the motor member can operate in forward and reverse directions and further suck air and material into the output hose and out from the intake hose.

The combination of a vehicle and a spreader machine comprises a vehicle including a bed adapted to store and retain material upon the floor surface, and a spreader machine comprising a main body including a top wall with an aperture therethrough and a cap member able to be removably connected to and cover the aperture in the top wall, a bottom wall, and at least one side wall having an intake aperture and an output aperture spaced from the input aperture. The side walls are connected in between the top wall and the bottom wall to form an interior volume. The intake hose is removably attached to the intake aperture and the output hose is removably attached to the output aperture.

A rotatable blade member is connected to an interior surface of at least one side wall adjacent the intake aperture and is adapted to cut material entering through the intake aperture. A motor member is located within the interior volume and is adapted to rotate the rotatable blade member and suck air and material through the intake hose and push air and material out through the output hose.

At least one brace member is adapted to be releasably attached to a distal end of the intake hose and adapted to brace the intake hose upon the floor surface of the vehicle bed for use in sucking in material therefrom and into the distal end of the intake hose.

At least two wheel members are attached to an exterior surface of at least one side wall and the bottom wall. The brace member(s) include at least one hook portion adapted to removably hook onto a portion of the vehicle bed. The output hose includes a handle member attached to the distal end to allow a user to move the distal end around while material is being pushed outwardly therefrom. The intake hose and the output hose are formed from a flexible material chosen from the group of materials consisting of rubber and nylon. The main body is formed in a box-shape.

An intake/output switch is attached to the outer surface of the main body that is electrically connected to the motor member to operate either in a forward or a reverse direction to suck air and material into the output hose and out from the intake hose or into the intake hose and discharge through the output hose.

The present invention holds significant improvements and serves as a mulch cutting and spreading machine. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, spreading machine, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to bulk material spreaders and more particularly to a mulch cutting and spreading machine as used to provide mulch chopping and spreading in one operation.

Generally speaking, a spreading machine is a machine that is designed to be able to suction mulch out of the bed of a vehicle that is towing the spreading machine and to simultaneously suction and chop the mulch and discharge it through a discharge hose that is directed by the user. The mulch or other such material can be then blown or spread over an area quickly in one combined action.

Figure 1:
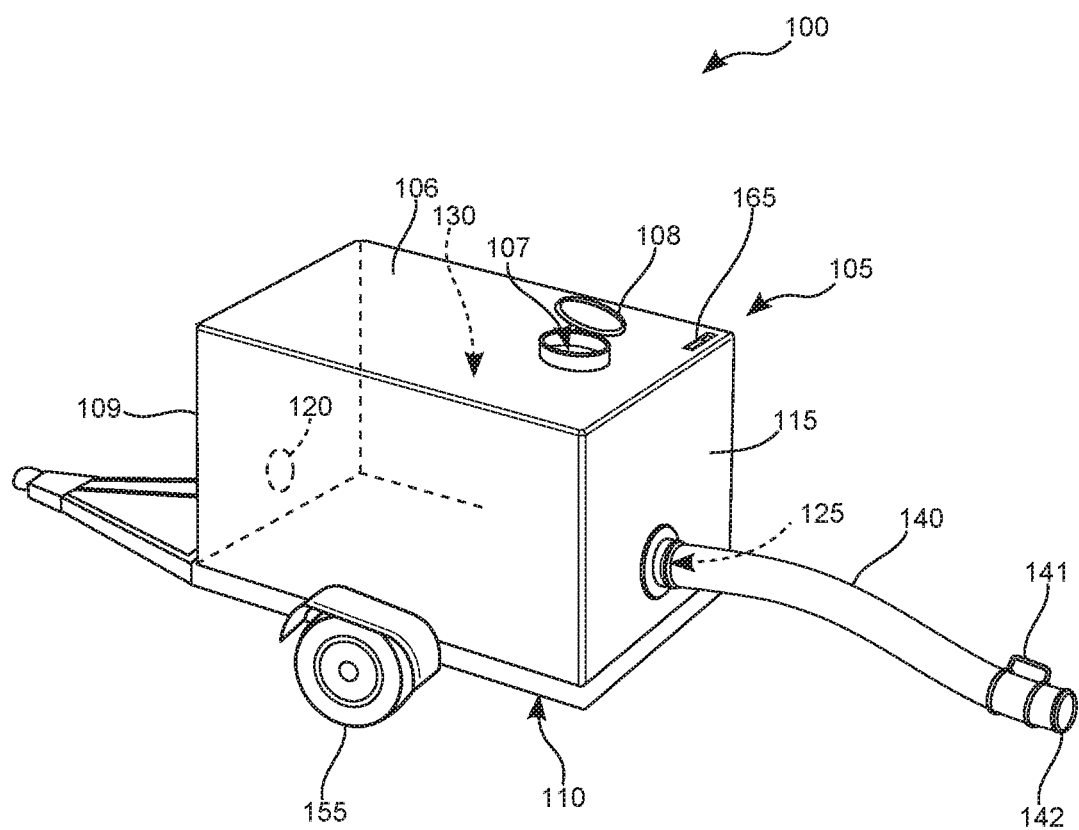
FIG. 1 shows a perspective view illustrating a spreading machine according to an embodiment of the present invention.

Referring to the drawings by numerals of reference there is shown in FIG. 1, a perspective view illustrating spreader machine 100 according to an embodiment of the present invention.

Spreader machine 100 preferably comprises main body 105 including top wall 106 having aperture 107 therethrough and cap member 108 removably connected and removably covering aperture 107 in top wall 106, bottom wall 110 and at least one side wall 115 that includes intake aperture 120 therethrough, and output aperture 125 therethrough spaced apart from intake aperture 120. Side wall(s) 115 are connected in between top wall 106 and bottom wall 110 to form interior volume 130. Intake hose 135 is removably attached to intake aperture 120 and output hose 140 is removably attached to output aperture 125.

Rotatable blade member 145 is connected to an interior surface of side wall(s) 115 adjacent intake aperture 120 and is adapted to cut material 170 entering through intake aperture 120. Motor member 150 located within interior volume 130 is adapted to rotate rotatable blade member 145 and suck air and material 170 through intake hose 135 and push air and chopped material 170 out through output hose 140.

Figure 2:
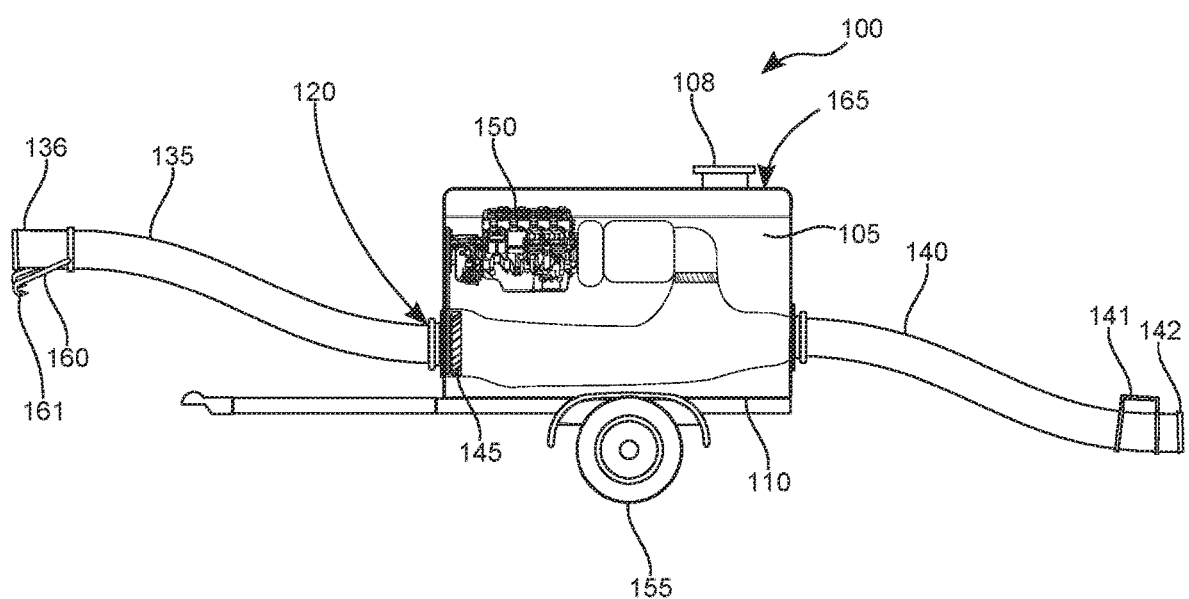
FIG. 2 is a side view illustrating the spreading machine according to an embodiment of the present invention of FIG. 1.

Referring now to FIG. 2, is a side view illustrating spreader machine 100 according to an embodiment of the present invention of FIG. 1.

At least two wheel members 155 are attached to exterior surface 109 of at least one of side wall(s) 115 and bottom wall 110. At least one brace member 160 is releasably attached to distal end 142 of intake hose 135 and adapted to brace intake hose 135 upon a surface of vehicle 205 bed 210 for use in sucking in material 170 from vehicle 205 bed 210 into distal end 136 of intake hose 135.

Brace member(s) 160 may include at least one hook portion 161 adapted to removably hook onto a portion of vehicle 205 bed 210. Output hose 140 includes handle member 141 attached to distal end 142 and is adapted to allow a user to move distal end 142 around while material 170 is being pushed outwardly therefrom. Intake hose 135 and output hose 140 are preferably formed from a flexible material chosen from the group of materials consisting of rubber and nylon. Main body 105 is formed into a box-shape.

Intake/output switch 165 attached to exterior surface 109 of main body 105, is electrically connected to motor member 150, and is adapted to control motor member 150 such that motor member 150 can operate in forward and reverse directions and further suck air and material 170 into output hose 140 and out from intake hose 135.

Figure 3:
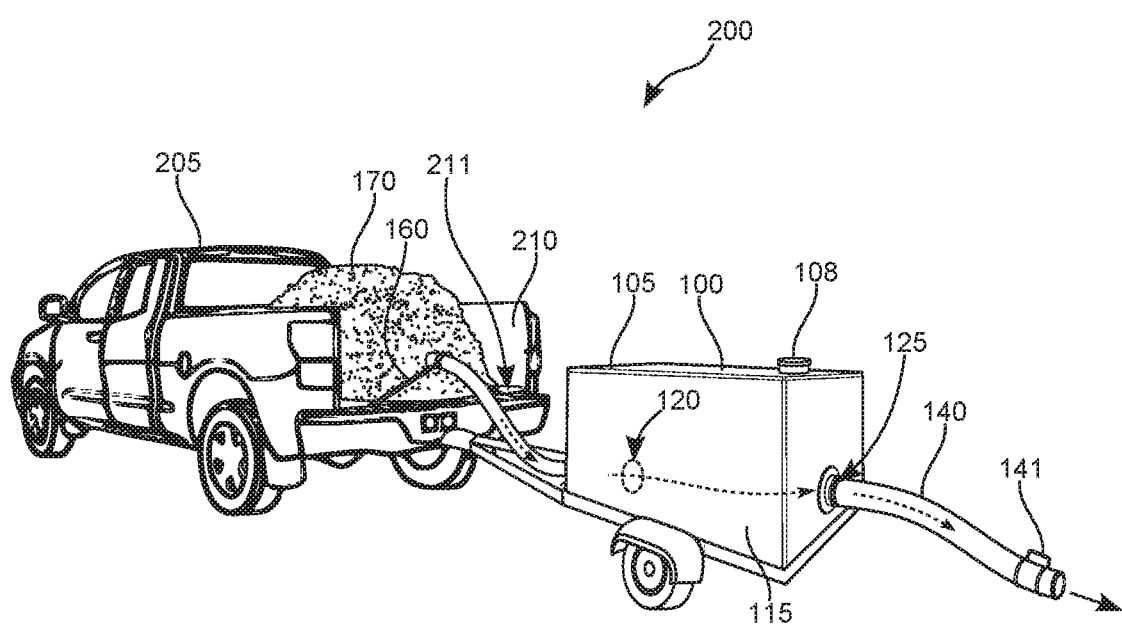
FIG. 3 is a perspective view illustrating a combination of a vehicle and a spreader machine according to an embodiment of the present invention of FIG. 1.

Referring now to FIG. 3, is a perspective view illustrating combination of a vehicle and a spreader machine 200 according to an embodiment of the present invention of FIG. 1.

Combination of a vehicle and a spreader machine 200 comprises vehicle 205 including bed 210 adapted to store and retain material 170 upon floor surface 211, and spreader machine 100 comprising main body 105 including top wall 106 with aperture 107 therethrough and cap member 108 able to be removably connected to and cover aperture 107 in top wall 106, bottom wall 110, and at least one side wall(s) 115 having intake aperture 120 and output aperture 125 spaced from intake aperture 120. Side wall(s) 115 are connected in between top wall 106 and bottom wall 110 to form interior volume 130. Intake hose 135 is removably attached to intake aperture 120 and output hose 140 is removably attached to output aperture 125.

Rotatable blade member 145 is connected to an interior surface of at least one side wall(s) 115 adjacent intake aperture 120 and is adapted to cut material 170 entering through intake aperture 120. Motor member 150 is located within interior volume 130 and is adapted to rotate rotatable blade member 145 and suck air and material 170 through intake hose 135 and push air and material 170 out through output hose 140.

Figure 4:
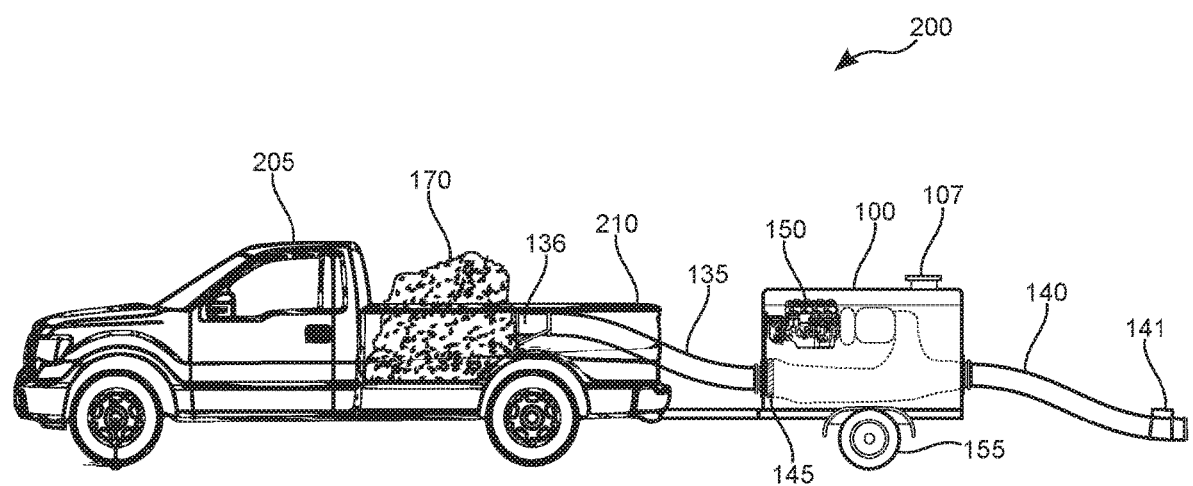
FIG. 4 is a side view illustrating the combination of a vehicle and a spreader machine according to an embodiment of the present invention of FIG. 1.

Referring now to FIG. 4, is a side view illustrating combination of a vehicle and a spreader machine 200 according to an embodiment of the present invention of FIG. 1.

At least one brace member(s) 160 is adapted to be releasably attached to distal end 136 of intake hose 135 and adapted to brace intake hose 135 upon floor surface 211 of vehicle 205 bed 210 for use in sucking in material 170 therefrom and into distal end 136 of intake hose 135.

At least two wheel members 155 are attached to exterior surface 109 of at least one side wall(s) 115 and bottom wall 110. Brace member(s) 160 include at least one hook portion 161 adapted to removably hook onto a portion of vehicle 205 bed 210. Output hose 140 includes handle member 141 attached to distal end 142 to allow a user to move distal end 142 around while material 170 is being pushed outwardly therefrom. Intake hose 135 and output hose 140 are formed from a flexible material chosen from the group of materials consisting of rubber and nylon. Main body 105 is formed in a box-shape.

Intake/output switch 165 is attached to exterior surface 109 of main body 105 that is electrically connected to motor member 150 to operate either in a forward or a reverse direction to suck air and material 170 into output hose 140 and out from intake hose 135 or into intake hose 135 and discharge through output hose 140.

Spreader machine 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:
1. A spreader machine comprising:
a main body including:
   a top wall including:
      an aperture therethrough; and
      a cap member;
         wherein said cap member is removably connected and removably covers said aperture in said top wall;
   a bottom wall; and
   at least a first side wall and a second side wall opposite said first side wall including:
      an intake aperture extending through said first side wall; and
      an output aperture extending through said second side wall;
      wherein said side walls are connected in between said wall and said bottom wall;
   wherein said side walls, said top wall, and said bottom wall from an interior volume;
an intake hose;
   wherein said intake hose is removably attached to said intake aperture;
an output hose;
   wherein said cutout hose is removably attached to said output aperture;
a rotatable blade member;
   wherein said rotatable blade member is connected to an interior surface of said first side wall adjacent said intake aperture and is adapted to cut material entering through said intake aperture;
a motor member;
   wherein said motor member is located within said interior volume and is adapted to rotate said rotatable blade member and to suck air and material through said intake hose, through said rotatable blade and push air and material out through said output hose via a chamber connected to said motor, said intake aperture and said output aperture, whereby said rotatable blade is between said intake hose and said chamber; and
   wherein said motor member is further adapted to rotate said rotatable blade member to suck air and material through said output hose and push air and material out through said intake hose via said chamber; and
an intake/output switch;
   wherein said intake/output switch is attached to an outer surface of said main body, is electrically connected to said motor member, and is adapted to control said motor member such that said motor member can operate in forward and reverse directions and further suck air and material into said output hose and out from said intake hose.

2. The spreader machine of claim 1, further comprising at least two wheel members attached to an exterior surface of said bottom wall.

3. The spreader machine of claim 1, further comprising at least one brace member releasably attached to a distal end of said intake hose and adapted to brace said intake hose upon a surface of a vehicle bed for use in sucking in material therefrom and into said distal end of said intake hose.

4. The spreader machine of claim 3, wherein said at least one brace member includes at least one hook portion adapted to removably hook onto a portion of said vehicle bed.

5. The spreader machine of claim 1, wherein said output hose includes a handle member attached to a distal end thereof and adapted to allow a user to move said distal end around while material is being pushed outwardly therefrom.

6. The spreader machine of claim 1, wherein said intake hose and said output hose are formed from a flexible material.

7. The spreader machine of claim 6, wherein said flexible material is chosen from a group of materials consisting of rubber and nylon.

8. The spreader machine of claim 1, wherein said main body is formed in a box-shape.

9. A combination of a vehicle and a spreader machine, said combination comprising:
   a vehicle including:
      a bed adapted to store and retain material therein;
         wherein said bed includes a floor surface; and
   a spreader machine comprising:
      a main body including:
         a top wall including:
            an aperture therethrough; and
         a cap member;
            wherein said cap member is removably connected and removably covers said aperture in said top wall;
         a bottom wall; and
         at least a first side wall and a second side wall opposite said first side wall including:
            an intake aperture extending through said first side wall; and
            an output aperture extending through said second side wall;
            wherein said side walls are each connected in between said top wall and said bottom wall;
         wherein said side walls, said top wall, and said bottom wall form an interior volume;
      an intake hose;
         wherein said intake hose is removably attached to said intake aperture;
      an output hose;
         wherein said output hose is removably attached to said output aperture;
      a rotatable blade member;
         wherein said rotatable blade member is connected to an interior surface of said first side wall adjacent said intake aperture and is adapted to cut material entering through said intake aperture;
      a motor member;
         wherein said motor member is located within said interior volume and is adapted to rotate said rotatable blade member and to suck air and material through said intake hose, through said rotatable blade and push air and material out through said output hose via a chamber connected to said motor, said intake aperture and said cutout aperture, whereby said rotatable blade is between said intake hose and said chamber; and
         wherein said motor member is further adapted to rotate said rotatable blade member to suck air and material through said output hose and push air and material out through said intake hose via said chamber;
      least one brace member;
         wherein said least one brace member is adapted to be releasably attached to a distal end of said intake hose and adapted to brace said intake hose upon said floor surface of said vehicle bed for use in sucking in material therefrom and into said distal end of said intake hose; and
      an intake/output switch;
         wherein said intake/output switch is attached to an outer surface of said main body, is electrically connected to said motor member, and is adapted to control said motor member such that said motor member can operate in forward and reverse directions and further suck air and material into said output hose and out from said intake hose.

10. The spreader machine of claim 9, further comprising at least two wheel members attached to an exterior surface of said bottom wall.

11. The spreader machine of claim 9, wherein said at least one brace member includes at least one hook portion adapted to removably hook onto a portion of said vehicle bed.

12. The spreader machine of claim 9, wherein said output hose includes a handle member attached to a distal end thereof and adapted to allow a user to move said distal end around while material is being pushed outwardly therefrom.

13. The spreader machine of claim 9, wherein said intake hose and said output hose are formed from a flexible material.

14. The spreader machine of claim 13, wherein said flexible material is chosen from a group of materials consisting of rubber and nylon.

15. The spreader machine of claim 9, wherein said main body is formed in a box-shape.

* * * * *